(12) United States Patent
Schlipf et al.

(10) Patent No.: US 8,584,992 B2
(45) Date of Patent: Nov. 19, 2013

(54) ADJUSTMENT MECHANISM OF AN ADJUSTMENT DEVICE FOR COUPLING AN ADJUSTMENT FLAP TO A MAIN WING, AND SUCH AN ADJUSTMENT DEVICE

(75) Inventors: Bernhard Schlipf, Bremen (DE); Mirko Missbach, Bremen (DE)

(73) Assignee: Airbus Operations GmbH, Hamburg (DE)

(*) Notice: Subject to any disclaimer, the term of this patent is extended or adjusted under 35 U.S.C. 154(b) by 89 days.

(21) Appl. No.: 13/398,866

(22) Filed: Feb. 17, 2012

(65) Prior Publication Data

US 2012/0211604 A1 Aug. 23, 2012

Related U.S. Application Data

(63) Continuation of application No. PCT/EP2010/005038, filed on Aug. 17, 2010.

(60) Provisional application No. 61/234,378, filed on Aug. 17, 2009.

(30) Foreign Application Priority Data

Aug. 17, 2009 (DE) .......................... 10 2009 037 707

(51) Int. Cl.
*B64C 3/50* (2006.01)

(52) U.S. Cl.
USPC ........................................ 244/215

(58) Field of Classification Search
USPC .......................................... 244/131, 213–217
See application file for complete search history.

(56) References Cited

U.S. PATENT DOCUMENTS

| | | | |
|---|---|---|---|
| 7,600,718 B2 * | 10/2009 | Perez-Sanchez | 244/215 |
| 7,861,978 B2 * | 1/2011 | Holert | 244/215 |
| 8,302,913 B2 * | 11/2012 | Schlipf | 244/215 |
| 2009/0001224 A1 | 1/2009 | Perez-Sanchez | |

FOREIGN PATENT DOCUMENTS

| | | |
|---|---|---|
| DE | 23 54 420 | 5/1975 |
| DE | 10 2005 044 549 | 3/2007 |
| EP | 1 764 303 | 3/2007 |
| GB | 2 073 681 | 4/1981 |
| GB | 2 362 363 | 5/2001 |

OTHER PUBLICATIONS

International Search Report for Application Serial No. PCT/EP2010/005038 dated Jun. 1, 2011.
International Preliminary Report on Patentability and Written Opinion for Application Serial No. PCT/EP2010/005038 dated Mar. 1, 2012.

* cited by examiner

*Primary Examiner* — Tien Dinh
*Assistant Examiner* — Jamie S Stehle
(74) *Attorney, Agent, or Firm* — Jenkins, Wilson, Taylor & Hunt, P.A.

(57) ABSTRACT

An adjustment mechanism of a device for coupling a flap to a wing of an aerofoil and for adjusting the flap. The adjustment mechanism includes: a first lever, hinged to the wing via a first rotational joint to form a first axis of rotation; a second lever; a third lever, hingedly coupled to the second lever via a second rotational joint to form a second axis of rotation and hingedly coupled to the flap via a fourth rotational joint; and a push-pull rod, which is connected via a first ball joint to the second lever and via a second ball joint to the flap. The first lever and the second lever are hingedly coupled to one another via a middle joint to form a third axis of rotation. The first, second and third axes of rotation in each position of the flap run through a common pole.

17 Claims, 4 Drawing Sheets

ADJUSTMENT MECHANISM OF AN ADJUSTMENT DEVICE FOR COUPLING AN ADJUSTMENT FLAP TO A MAIN WING, AND SUCH AN ADJUSTMENT DEVICE

CROSS-REFERENCE TO RELATED APPLICATIONS

The present application is a continuation of International Application No. PCT/EP2010/005038, filed on Aug. 17, 2010, which claims priority from German Application DE 10 2009 037 707.7, filed on Aug. 17, 2009, and claims the benefit of U.S. Provisional application 61/234,378, filed on Aug. 17, 2009, each of which is hereby incorporated in its entirety by reference.

FIELD OF THE INVENTION

The invention relates to an adjusting mechanism of an adjusting device for coupling an adjustable flap and in particular a high lift flap to a main wing, and to a like adjusting device.

BACKGROUND

From DE 10 2005 044 549 B4 there is known a wing including a main wing and a high lift flap which is movably arranged on the wing by means of at least two adjusting mechanisms disposed side by side in the span-wise direction of the wing, wherein each one of the adjusting mechanisms is made up of levers interconnected in an articulated manner so as to form three articulation axes whose directions meet in a common pole.

SUMMARY

Various embodiments of the invention provide an adjusting mechanism of an adjusting device for coupling an adjustable flap and in particular a high lift flap to a wing or main wing, as well as such an adjusting device, the adjusting device of which is optimized kinematically.

According to one aspect of various embodiments of the invention, an adjusting mechanism of an adjusting device for coupling an adjustable flap or in particular a high lift flap, i.e. generally a flap, to a main wing of a wing and for adjusting the high lift flap. The adjusting mechanism includes in particular:
 a first adjusting lever linked to the main wing via a first rotary joint so as to establish a first axis of rotation,
 a second adjusting lever,
 a third adjusting lever coupled in an articulated manner to the second adjusting lever so as to establish a second axis of rotation and coupled in an articulated manner to the adjustable flap via a fourth rotary joint, wherein the first adjusting lever and the second adjusting lever are coupled to each other in an articulated manner via a central joint so as to establish a third axis of rotation, and wherein the first, second and third axes of rotation pass through a common pole in every position of the adjustable flap, and
 a pull-push rod connected to the second adjusting lever via a first ball joint and connected to the adjustable flap via a second ball joint.

As a result of the adjusting mechanism of various embodiments of the invention, extending the adjustable flap or the high lift flap to be adjusted is performed at the connecting location thereof on a circular path with concurrent rotation of the high lift flap about a span-wise axis integral with the flap.

For the purpose of coupling the flap to the main wing and adjusting it relative to the latter it may in particular be provided that the flap is coupled to the main wing by means of two or more adjusting mechanisms. The further adjusting mechanisms may be configured identically or differently as compared with the adjusting mechanism defined in the foregoing.

The adjusting mechanism of embodiments of the invention may in particular be provided for coupling a high lift flap having the form of a trailing edge flap, or the form of a leading edge flap and in particular of a Krueger flap, to a main wing. With the aid of an adjusting mechanism of various embodiments of the invention it may thus be achieved that the adjustable flap, if exclusively coupled to the main wing by means of adjusting mechanisms in the aforementioned manner, or otherwise at least the connecting location of the adjusting mechanism at the high lift flap, may be moved from the retracted position of the flap, or at least the area of the connecting location of the high lift flap may be moved to a sealing position ("sealed take-off position") relative to the main wing via a flap position presenting a gap ("landing position"). In the case of the sealing position, the flap is positioned relative to the main wing, at least in the area of the connecting location, such that there is no flow of air between the high lift flap and the main wing or only an flow of air with regard to the whole of the wing that is insignificant in terms of aerodynamics.

The adjusting mechanism of various embodiments of the invention generally presents the advantage that the adjusting mechanism only requires a low structural height and may thus also be realized in the form of thinner wing profiles. This applies in particular, e.g., with regard to a scissor mechanism which is employed in the prior art for the purpose of coupling Krueger flaps to a main wing. In comparison with the gooseneck kinematics, the adjusting mechanism of various embodiments of the invention presents the advantage of also allowing for axes of rotation or centers of rotation of the flap, and in particular of a flap having the form of a Krueger flap, which are situated in the vicinity or outside of the wing contour.

In accordance with an embodiment of the invention, an adjusting device for adjusting an adjustable flap and in particular a high lift flap on a wing of an aircraft including at least two adjusting mechanisms arranged side by side in the span-wise direction of the wing and a drive device for adjusting the adjustable flap is arranged movably relative to the main wing, wherein at least one of the adjusting mechanisms includes:
 a first adjusting lever linked to the main wing via a first rotary joint so as to establish a first axis of rotation,
 a second adjusting lever,
 a third adjusting lever coupled to the second adjusting lever in an articulated manner via a second rotary joint so as to establish a second axis of rotation and coupled to the adjustable flap in an articulated manner via a fourth rotary joint, wherein the first adjusting lever and the second adjusting lever are coupled to each other in an articulated manner via a central joint so as to establish a third axis of rotation, and wherein the first, second and third axes of rotation pass through a common pole in every position of the adjustable flap,
 a pull-push rod connected to the second adjusting lever via a first ball joint and connected to the adjustable flap via a second ball joint.

Here it may be provided that the fourth rotary joint of the adjusting mechanism has the form of a hinge joint in order to operate as a locating bearing which reduces the number of degrees of freedom of the mount of the adjustable flap.

Alternatively it may be provided that the fourth rotary joint of the adjusting mechanism has the form of a spherical rotary joint in order to increase the number of degrees of freedom of the mount of the adjustable flap.

The adjusting device may moreover include a further adjusting mechanism, including:
a first adjusting lever linked to the main wing via a first rotary joint so as to establish a first axis of rotation,
a second adjusting lever linked to the adjustable flap via a second rotary joint so as to establish a second axis of rotation,
wherein the first and the second adjusting lever are connected to each other in an articulated manner via a central joint so as to establish a third axis of rotation, and wherein the first, second and third axes of rotation pass through a common pole in every position of the adjustable flap.

Depending on the requirements of the particular application, it is possible in a special application that the adjusting mechanism of various embodiments of the invention is realized only on one station of the flap and a second station is realized with an adjusting mechanism of a different type having the same or different extending and retracting characteristics.

Furthermore, one—or in a given case several ones—of the further adjusting mechanisms may be executed without the pull-push rod.

The provision of adjusting mechanisms for coupling the adjustable flap to the third adjusting lever in conjunction with the pull-push rod allows to provide several specimens of the same adjusting mechanism on one high lift flap while at the same time realizing respective different bearing properties with the adjusting mechanisms. For example, a flap having at least two adjusting mechanisms may be coupled to a main wing, with the adjusting mechanisms mounting the main wing on the flap in an overdetermined or determined manner. Overdetermined mounts result in a higher degree of mechanical redundancy and thus in a higher mechanical safety which does, however, bring about internal stresses within the flap. By means of the determined mount, on the other hand, it is possible to reduce internal stresses within the flap.

When using two or more than two adjusting mechanisms having three adjusting levers coupled to each other, then it is possible for this purpose that the adjusting mechanisms are each realized with more or less degrees of freedom of mounting at the mount of the adjustable flap on the third adjusting lever, in order to mount the adjustable flap on the adjusting mechanisms as a whole in a determined or overdetermined manner.

Here the fourth rotary joint of one or several or all of the adjusting mechanisms of the adjusting device may have the form of a spherical rotary joint or ball joint. In combination with the pull-push rod which is mounted at both of its ends by means of a spherical rotary joint or ball joint, an additional degree of freedom of mounting the adjustable flap connecting location on the third adjusting lever is achieved in comparison with a hinge joint which only admits rotation about one axis, so that in this regard the adjusting mechanism is configured as a non-locating bearing: Due to this form of realization the third adjusting lever is imparted the function of a swing link, wherein the position of the non-locating bearing kinematics is determined in a defined manner by the ball joint and the pull-push rod, and wherein wing-span force components of the adjustable flap or force components thereof directed in the span-wise direction are not passed on to the main wing.

It may furthermore be provided that the fourth rotary joint of one or several or all of the adjusting mechanisms of the adjusting device has the form of a genuine rotary joint or of a hinge joint which does not admit a translatory degree of freedom in the axial direction of the hinge joint. The translatory degree of freedom may in particular be defined such that the admitted translatory movement is directed so as to include a component of movement in the span-wise direction of the flap or of the main wing. This type of mounting may be provided while including the pull-push rod mounted on both of its ends by a spherical rotary joint or ball joint or without it. In either case, mounting of the adjustable flap on the third adjusting lever is realized which has one degree of freedom less than the aforementioned swing link mount. If several or all of the adjusting mechanisms of the adjusting device are configured in this way, this results in overdetermined mounting of the flap on the adjusting mechanisms and thus on the main wing.

Determined mounting of the high lift flap on the main wing results, e.g., when the flap is coupled to the main wing by means of two adjusting mechanisms of various embodiments of the invention while an adjusting mechanism is formed to include a fourth joint, genuine rotary joint or hinge joint, which does not admit a translatory degree of freedom in the axial direction of the hinge joint, and the other adjusting mechanism includes a fourth joint having the form of a spherical rotary joint or ball joint.

In accordance with one example embodiment of the invention, the adjusting device may be executed such that the fourth rotary joint of an adjusting mechanism has the form of a spherical rotary joint so that it acts as a non-locating bearing in the span-wise direction of the high lift flap, and that the fourth rotary joint of the at least one further adjusting mechanism or of all of the further adjusting mechanisms has the form of a hinge joint with or without a pull-push rod, so that the latter acts as a locating bearing in the span-wise direction of the high lift flap. This adjusting mechanism serves a "master function" in the adjusting device, for it transmits force components directed in the span-wise direction of the adjustable flap to the adjusting levers and thus to the main wing. A further adjusting mechanism, or in a given case the further adjusting mechanisms, might be executed such that the pull-push rod is arranged on an adjusting mechanism, the fourth rotary joint of which has the form of a spherical rotary joint. This adjusting mechanism then serves a "slave function" in the adjusting device, for it admits one degree of freedom more than the aforementioned adjusting mechanism. In one practical example, at least one of the adjusting mechanisms is formed in this way with a fourth rotary joint as a spherical rotary joint, and the pull-push rod and one further adjusting mechanism is formed with a fourth rotary joint as a spherical rotary joint without a pull-push rod or has the form of a hinge joint without admission of a translatory movement of the third adjusting lever in the axial direction of the joint.

Alternatively, the pull-push rod may also be arranged on one or several adjusting mechanisms with a hinge joint in order to increase the rigidity of coupling of the flap to the main wing and the mechanical redundancy and safety of the adjusting device as a whole.

At least one adjusting mechanism having a master function with regard to the transmission of forces and/or moments of the flap to the main wing may also be realized by a pyramidal adjusting mechanism including two adjusting levers which are coupled to each other and to the adjustable flap or to the main wing by means of a hinge joint having a rotational degree of freedom.

In accordance with further embodiments of the invention, an adjusting device for adjusting a high lift flap on a wing of an aircraft is provided which includes at least two adjusting mechanisms arranged side by side in the span-wise direction of the wing and a drive device for adjusting the high lift flap relative to the main wing. Here each one of the adjusting mechanisms includes: a first adjusting lever linked to the main wing via a first rotary joint so as to establish a first axis of rotation, and a second adjusting lever linked to the high lift flap via a second rotary joint so as to establish a second axis of rotation.

The first and the second adjusting lever of each of the mentioned adjusting mechanisms are connected to each other in an articulated manner via a central joint so as to establish a third axis of rotation, with the first, second and third axes of rotation passing through a common pole in each position of the high lift flap.

In accordance with various embodiments of the invention it is also provided that at least one of the adjusting mechanisms includes:
  a third adjusting lever through which the second adjusting lever is linked to the high lift flap, wherein the third adjusting lever is connected to the second adjusting lever in an articulated manner via the second rotary joint and is connected the high lift flap in an articulated manner via a fourth rotary joint, and
  a pull-push rod or a connecting lever which is connected to the second adjusting lever via a first ball joint and to the high lift flap via a second ball joint.

In accordance with one example embodiment of the adjusting device of the invention, it may be executed such that the fourth rotary joint of the at least one further adjusting mechanism has the form of a spherical rotary joint, so that the latter acts in the span-wise direction of the high lift flap as a non-locating bearing or as a bearing having a slave function or with higher degrees of freedom than the at least one further adjusting mechanism.

A further adjusting mechanism or the further adjusting mechanisms of the adjusting device may be realized to includes the three adjusting levers, wherein the fourth rotary joint of at least one adjusting mechanism has the form of a hinge joint, so that the latter acts as a locating bearing having a master function in the span-wise direction of the high lift flap.

In such an adjusting mechanism, the fourth rotary joint may alternatively have the form of a hinge joint which admits a longitudinal displacement in an axial direction, so that this adjusting mechanism acts as a non-locating bearing having a slave function.

Accordingly, the adjusting device of various embodiments of the invention may be executed such that it includes an adjusting mechanism having a master function and at least one further adjusting mechanism having a slave function. As was described in the foregoing, it may here additionally be provided that only one or several ones of the adjusting mechanisms are executed in accordance with embodiments of the invention.

In accordance with one example embodiment of the adjusting device of the invention, it may be executed such that several ones of the adjusting mechanisms of the adjusting device each includes a pull-push rod connected to the second adjusting lever via a first ball joint and connected to the high lift flap via a second ball joint.

The high lift flap may in particular be a leading edge flap. Moreover the leading edge flap may be a Krueger flap which is situated in its retracted position on the lower side of the main wing. Furthermore the leading edge flap may be a slat. Alternatively, it may be provided in accordance with some embodiments of the invention that the high lift flap is a trailing edge flap.

In accordance with some embodiments of the invention, the drive device may be constituted by a linear drive. Alternatively, the drive device may be constituted by a rotary drive.

In accordance with a further example embodiment of the invention it is provided that the wing includes a stop device for limiting the maximum extended position of the high lift flap, and the stop device is formed to includes a stop lever acting between the first and the second adjusting lever, which is formed integrally with the first adjusting lever or with the second adjusting lever and as a prolongation of the latter in the direction of the second axis or of the first axis, and which is configured such that the free end of the stop lever may be taken to a position of abutment against a support device on the second adjusting lever or on the first adjusting lever, to thereby define the maximum extended position of the respective adjusting mechanism.

Furthermore it may be provided in accordance with a further example embodiment of the invention that the wing includes a stop device for limiting the maximum extended position of the high lift flap, and the stop device is formed to includes a stop lever for limiting the maximum extended position of the high lift flap which is formed integrally with the first adjusting lever or with an armature of the main wing and as a prolongation of the latter in the direction toward the armature of the main wing or toward the third joint, and which is configured such that the free end of the stop lever may be taken to a position of abutment against the armature of the main wing or the first adjusting lever to thereby define the maximum extended position of the respective adjusting mechanism.

In accordance with various embodiments of the invention it may also be provided that the wing includes a stop device for limiting the maximum extended position of the high lift flap, and the stop device is formed to includes a stop lever for limiting the maximum extended position of the high lift flap which is formed integrally with the second adjusting lever or with an armature of the high lift flap and as a prolongation of the latter in a direction toward the armature of the high lift flap or toward the third joint, and which is configured such that the free end of the stop lever may be taken to a position of abutment against the armature of the high lift flap or the second adjusting lever, to thereby define the maximum extended position of the respective adjusting mechanism.

The stop device may in particular be executed such that a maximum extended position of the leading edge flap is limited by it, in which the directions of action of the adjusting levers include an angle (alpha) of less than 180 degrees relative to each other. It may also be provided that a spring device cooperates with the stop lever so as to exert a resetting force on the adjusting mechanism and/or elastically cushion the accomplishment of the maximum extended position of the respective adjusting mechanism.

BRIEF DESCRIPTION OF THE DRAWINGS

In the following, example embodiments of the invention will be described by making reference to the appended figures, wherein.

DESCRIPTION

Figure 1:
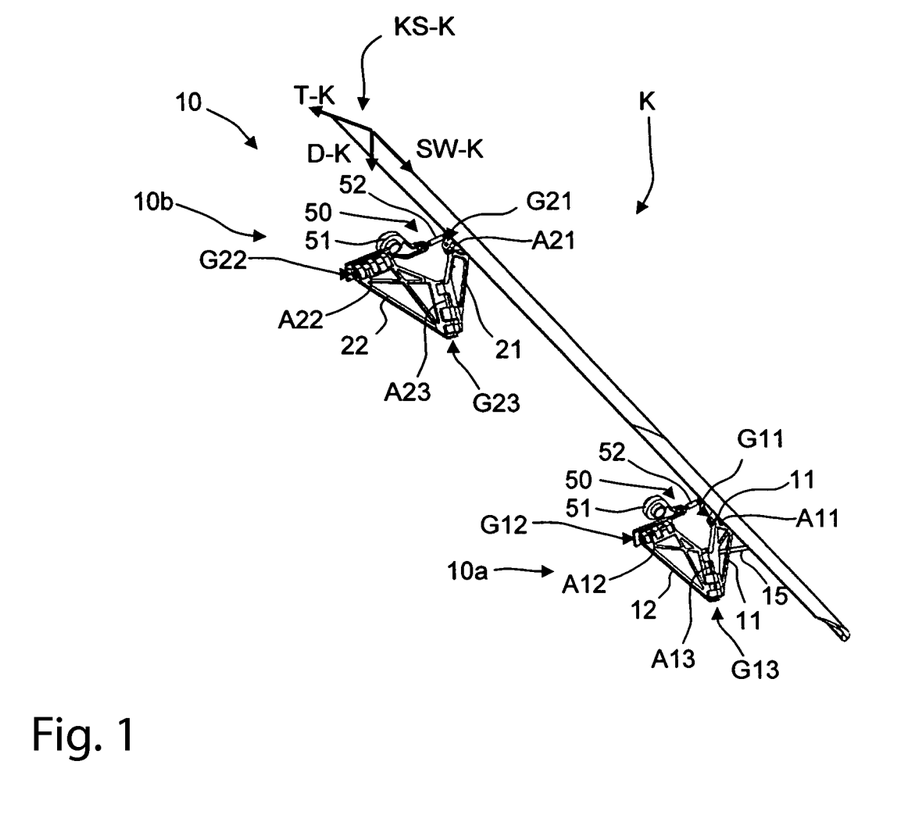
FIG. 1 is a schematic perspective representation of an example of a high lift flap to be arranged on a main wing of a wing of an embodiment of the invention having the form of a leading edge flap, which is arranged movably on the main wing by means of two adjusting mechanisms.

In FIG. 1 a practical example of the wing T of various embodiments of the invention including a main wing H and a high lift flap K is represented schematically. The high lift flap K is arranged on the main wing H by means of an adjusting device 10 including at least two adjusting mechanisms 10a, 10b which are arranged side by side in the span-wise direction H-SW of the main wing H or in the span-wise direction K-SW of the high lift flap K. In accordance with various embodiments of the invention, the high lift flap K may be a leading edge flap or a trailing edge flap.

In FIG. 1 the high lift flap K is a leading edge flap having the form of a slat. In accordance with various embodiments of the invention, the leading edge flap may also be a Krueger flap situated, in its retracted position, on the lower side H1 of the main wing H. The leading edge flap K is represented in an extended position in FIG. 1. In FIG. 1 two adjusting mechanisms 10a, 10b are represented as an illustration of the functional principle of various embodiments of the invention by way of the represented detail of the main wing H and of the leading edge flap K. Furthermore a coordinate system KS-H for the main wing H including the main wing span-wise direction SW-H, the main wing depth direction T-H and the main wing thickness direction D-H as the coordinate axes, as well as a coordinate system KS-K for the high lift flap K including the high lift flap span-wise direction SW-K, the high lift flap depth direction T-K and the high lift flap thickness direction D-K as coordinate axes are entered in FIG. 1.

In FIG. 1 the high lift flap K represented there, or the leading edge flap arranged on the main wing so as to be movable between a retracted and an extended position by means of the at least two adjusting mechanisms 10a, 10b, is shown in an extended position wherein the represented extended position is not the maximum extended position of the high lift flap K or of the leading edge flap, respectively.

As may be seen from FIG. 1, the adjusting mechanism 10a of the adjusting device 10 includes in particular:

a first adjusting lever 11 linked to the main wing H via a first rotary joint G11 so as to establish a first axis of rotation A11, wherein the axis of rotation A11 of the first rotary joint 13 extends transversely or at an angle to the main wing span-wise direction SW-H and main wing depth direction T-H, a second adjusting lever 12 linked to the high lift flap K or the leading edge flap via a second rotary joint G12 so as to establish a second axis of rotation A12, wherein the axis of rotation A12 of the second rotary joint G12 extends transversely or at an angle to the high lift flap span-wise direction SW-K and the high lift flap thickness direction D-K, a central joint G13 connecting the first 11 and the second 12 adjusting levers in an articulated manner so as to establish a third axis of rotation A13.

In accordance with various embodiments of the invention, the directions of the first, second and third axes of rotation A11, A12, and A13 of the first adjusting mechanism 10a meet, independently of the position of the high lift flap K or of the leading edge flap, in a common pole P. The adjusting device may be provided such that pole P is stationary during an adjustment of the high lift flap K relative to the position of the main wing. As a result, the high lift flap K executes a movement along a moving path in the form of part of a circle relative to the main wing H when it is moved from its retracted position into the extended position, and vice versa.

Figure 2:
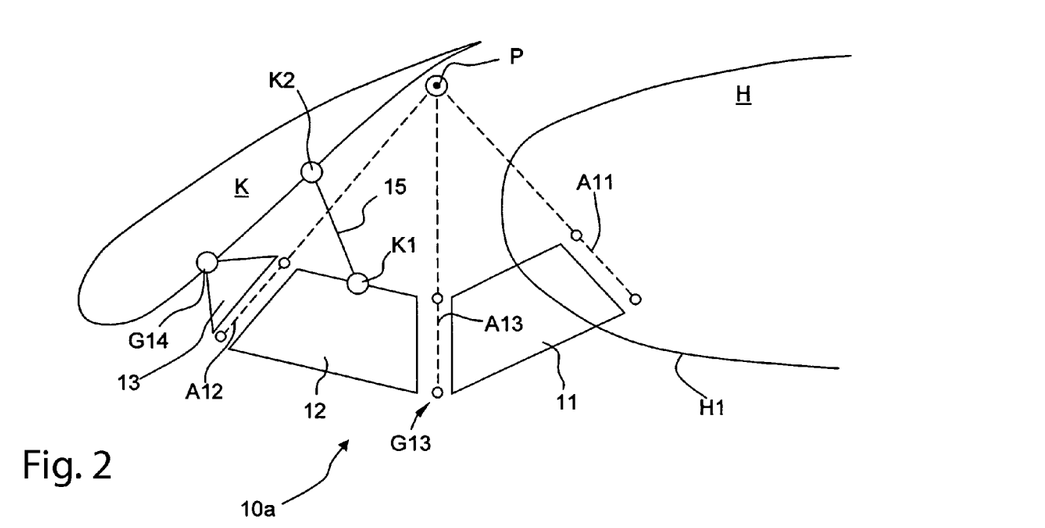
FIG. 2 is a schematic diagram of an example according to an embodiment of the invention of one of the adjusting mechanisms including a first, a second and a third lever as well as a connecting lever which is connected to the second adjusting lever via a first ball joint and to the high lift flap via a second ball joint.
Figure 3:
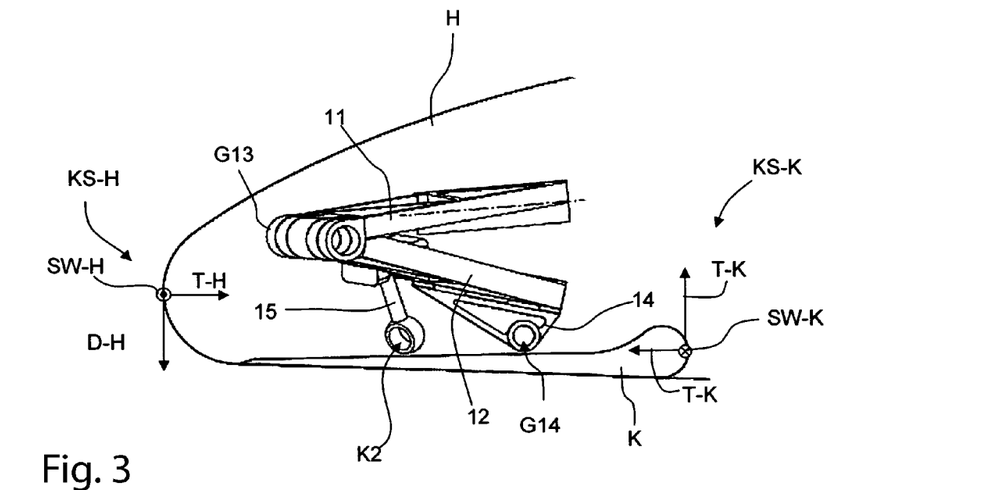
FIG. 3 is a schematic perspective lateral view of one of the adjusting mechanisms formed in accordance with the diagram of FIG. 2, in a condition where the high lift flap is in its retracted position.

In accordance with various embodiments of the invention, in at least one of the adjusting mechanisms there is coupled to the second adjusting lever 12 a third adjusting lever 13 which in turn is linked to the high lift flap K; i.e., the respective adjusting mechanism includes a third adjusting lever 13 through which the second adjusting lever 12 is linked to the high lift flap K. Here the third adjusting lever 13 is connected in an articulated manner to the second adjusting lever 12 via the second rotary joint G12 and connected in an articulated manner to the high lift flap K via a fourth rotary joint G14. The rotary joint G14 may be executed as a rotary joint having one axis of rotation, i.e. as a hinge joint. Depending on the application, the rotary joint G14 executed as a hinge joint may be executed such that the transmission lever 13 is longitudinally displaceable relative to the flap K at least within predetermined limits in the longitudinal direction of the axis of rotation of the joint G14, so that the rotary joint G14 executed in this way acts as a non-locating bearing. The rotary joint G14 may also be executed as a hinge joint in such a way that it does not admit a movement of the transmission lever 13 in the longitudinal direction of the axis of rotation of the joint G14. Alternatively, the rotary joint G14 may be executed as a spherical rotary joint G14 such that it acts as a locating bearing when viewed transversely to the line of lever action of the transmission lever 13. In FIG. 1 the third adjusting lever 13 is only indicated by an arrow as a component part of the first adjusting mechanism 10a while not being represented as a functional part. In FIG. 2, which is a functional diagram of a first adjusting mechanism 10a, the third adjusting lever 13 is represented.

As may be seen in FIGS. 1 and 2, the first adjusting mechanism 10a includes a pull-push rod 15 which is connected to the second adjusting lever 12 via a first ball joint K1 and connected to the high lift flap K via a second ball joint K2.

The second adjusting mechanism 10b of the adjusting device 10 shown in FIG. 1 includes:

a first adjusting lever 21 linked to the main wing H via a first rotary joint G21 so as to establish a first axis of rotation A21, wherein the axis of rotation A21 of the first rotary joint G21 extends transversely or at an angle to the main wing span-wise direction SW-H and the main wing depth direction T-H, a second adjusting lever 22 linked to the high lift flap K or to the leading edge flap via a second rotary joint G22 so as to establish a second axis of rotation A22, wherein the axis of rotation A22 of the second rotary joint G22 extends transversely or at an angle to the high lift flap span-wise direction SW-K and the high lift flap thickness direction D-K, a central joint G23 interconnecting the first 21 and the second 22 adjusting lever in an articulated manner so as to establish a third axis of rotation A23.

In accordance with various embodiments of the invention, the respective directions of the first, second and third axes of rotation A1, A2 and A3 of the second adjusting mechanism 10b meet in a common pole P, independently of the position of the high lift flap K or of the leading edge flap. In a specific embodiment of the second adjusting mechanism, the latter may be configured such that during an adjustment of the high lift flap K the common pole P is stationary relative to the position of the main wing, i.e., independent of the position of the high lift flap K or of the leading edge flap, respectively.

In accordance with various embodiments of the invention, the drive mechanism of the adjusting device for its adjustment may be executed in various manners. The drive device 50 may generally be constituted, e.g., by a linear drive or a rotary drive, where in particular it may be provided that the wing T includes a drive device 50 having a drive module 51 which is mounted on the main wing H, and a drive lever 52 which is movable relative to the latter and coupled to the high lift flap, and that the wing T includes a stop device 60 for limiting the maximum extended position of the high lift flap K or of the leading edge flap, respectively.

Alternatively it may be provided that the drive device acts on one of the adjusting levers of the adjusting device 10 and adjusts the latter in order to adjust the adjusting device. Here it may be provided that the drive device has the form of a linear drive and is coupled to the joints of the first and second adjusting mechanisms, so as to connect the respective first and the second adjusting lever of an adjusting mechanism in an articulated manner. Moreover it may be provided that the drive device has the form of a linear drive and is arranged between two adjusting levers of different adjusting mechanisms 10a, 10b while being coupled to these. By moving apart and mutually approaching (contracting) the linear drive of the drive device, the two are pushed apart or together by this coupled adjusting lever, with the adjusting device being moved into a retracted or extended condition in the process. Here the drive device may be coupled between a first adjusting lever of the first adjusting mechanism and a second adjusting lever of the second adjusting mechanism, and vice versa.

In accordance with various embodiments of the invention, in at least one adjusting mechanism 10a, 10b of an adjusting device 10 a joint intermediate part Z having a base body Z1 is used. In particular the joint intermediate part Z is used on precisely one adjusting mechanism 10a, 10b of an adjusting device 10.

Due to the coupling connection of the third adjusting lever to the high lift flap K via a ball joint or spherical joint and due to the coupling of the pull-push rod 15 (in FIG. 1 shown only on the adjusting mechanism 10a) which is coupled to the second adjusting lever 12 via a first ball joint K1 and to the high lift flap K via a second ball joint K2, a non-locating bearing having a "slave function" is realized. In contrast, in the case of an adjusting mechanism having two adjusting levers which are coupled—as shown by way of the second adjusting mechanism 10b in FIG. 1—via hinge joints to each other or to the main wing or the high lift flap, a locating mount of the respective adjusting mechanism on the high lift flap K having a "master function" is provided. An adjusting mechanism having a locating bearing may in one example according to various embodiments of the invention also be formed with a first and a second transmission lever, wherein the first transmission lever is directly coupled via a hinge joint to the main wing and the second transmission lever.

In the case of an adjusting device which includes two so-called pyramidal adjusting mechanisms each having a kinematic pole P it is possible, through an appropriate configuration of the adjusting mechanisms in terms of providing kinematic degrees of freedom at the respective adjusting mechanism, to minimize internal forces or structural stresses brought about as a consequence of coercing forces occurring in the main wing, the adjustable flap K and/or the adjusting mechanisms, and/or occurring as a result of the forces engendered during the adjustment of the adjusting device by means of the drive device. Such internal forces, or structural stresses, may in particular be engendered due to the deformation of the main wing and/or of the high lift flap K when external forces such as, e.g., aerial forces, occur. Due to the solution in accordance with various embodiments of the invention, the structural parts of the adjusting device of embodiments of the invention or of the wing T of embodiments of the invention may be designed in a more favorable manner.

The pole P is the center of rotation or the axis of rotation G14 defined in three-dimensional space, wherein the pole P may in particular be positioned in the vicinity or also externally of the wing contour and/or the flap contour. Kinematics forcibly bring about a rotation of the transmission lever 11 about the axis A11 which is integral with the wing. The transmission lever 12 is linked to the transmission lever 11 so as to be rotatable about the axis A13. The transmission lever 13 connecting to the pyramidal kinematics having the axes of rotation A11, A12, A13 is coupled to the transmission lever 12 so as to be rotatable about the axis A13. The prolongations of all three axes A11, A12, A13 have their common point of intersection P within the kinematic plane. The axes A113 and A11 as well as the axis or the axial point of the joint G14 are contained in the kinematic plane. Here the axis or the axial point of the joint G14 is the point of intersection of the axis that is non-rotational relative to the transmission lever 13 and the flap K or the axial point of the joint G14 with the kinematic plane. The transmission lever 13 can move out of the kinematic plane.

When several pyramidal kinematics are used on one flap, the poles of the respective pyramidal kinematics are situated on a line along the flap and theoretically on one straight line. In this case particularly the axis of the joint—where executed as a hinge joint—may be in parallel with this line.

When the adjusting device is executed with two adjusting mechanisms each executed as a pyramidal kinematic, the mentioned positional conditions result in an alteration of the angle between the transmission lever 12 and the transmission lever 13. As the first ball joint K1 is arranged stationarily on the second transmission lever 12 and the second ball joint K2 is arranged stationarily on the flap K, the pull-push rod 15 will cause the flap K to rotate about an axis integral with the flap by means of the joint G14, due to the relative movement between the flap K and the pyramidal kinematic.

When the adjusting device is executed with more than two adjusting mechanisms which are executed as pyramidal kinematics each including three adjusting levers, the centers of rotation of the joint G14, when executed as rotary joints, are situated on one line, with the line being a straight line if one disregards the deformation of the flap K. When the joint G14 is executed as hinge joints, it may in particular be provided that the axes of rotation of the hinge joints are situated on a straight line or at least extend in parallel with each other if one disregards the deformation of the flap K.

When configuring the adjusting device according to the locating/non-locating concept, one or at least one adjusting mechanism is configured as a non-locating bearing (slave function) and one or at least one adjusting mechanism as a locating bearing (master function). By realizing a statically determined mount, coercive forces due to wing and flap deformation as well as due to thermal expansion may be reduced or even prevented. The locating bearing may be configured such that the axis of the joint G4 is non-rotational relative to the adjustable flap K and the third adjusting lever 13. In the case of a non-locating bearing, the coupling of the adjustable flap K to the third adjusting lever 13 and thus in the joint G4 is spherical, so that the third adjusting lever 13 is given the function of a swing link.

Figure 6:
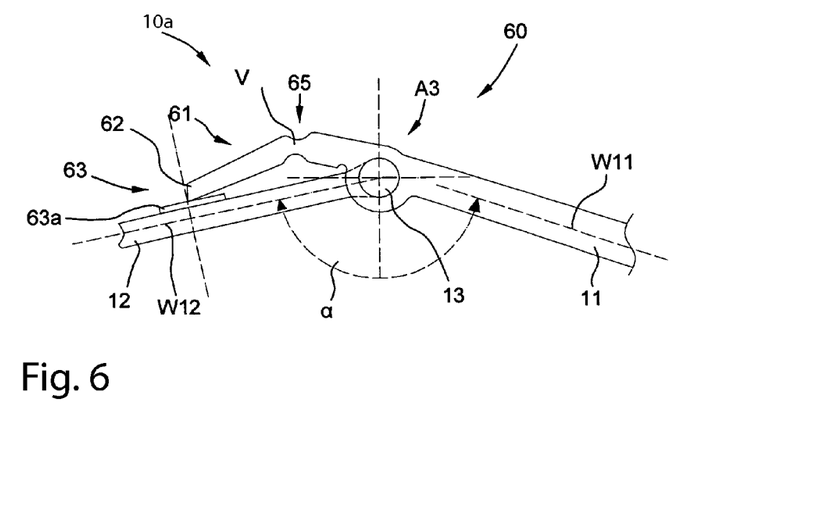
FIG. 6 is a sectional view of a practical example of a stop device for limiting the maximum extended position of the high lift flap.
Figure 7:
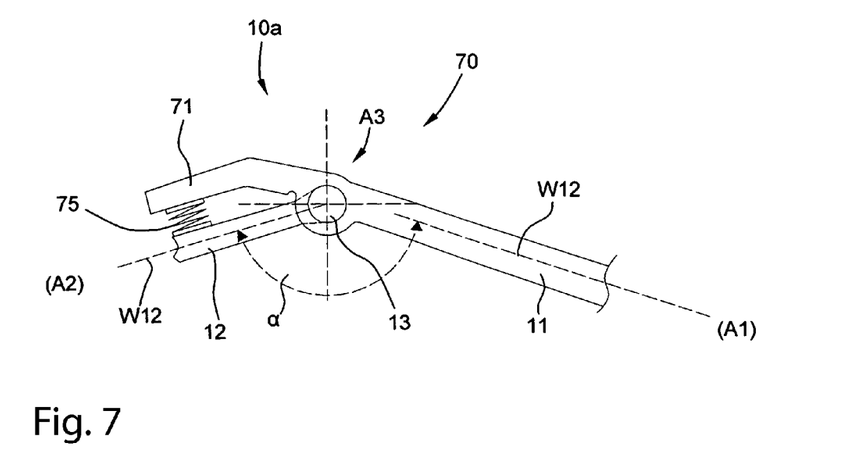
FIG. 7 is a sectional view of a further practical example of a stop device for limiting the maximum extended position of the high lift flap.

On one or several ones of the drive mechanisms a stop device for limiting the maximum extended position of the lever of the respective adjusting mechanism may be provided. A like stop device may be formed in various manners and in particular with a stop lever. The stop device may be provided on only one adjusting mechanism, on several adjusting mechanisms, or on all of the adjusting mechanisms of an adjusting device 10. FIGS. 6 and 7 represent respective practical examples of the stop device of various embodiments of the invention, wherein these represented practical examples of the stop device act between the first 11 and a second 12 adjusting lever, so that in the maximum extended position defined by the stop device the lines of effect W11 and W12 extend relative to each other at an angle alpha ($\alpha$). In this case the line of effect of the first adjusting lever or of the second adjusting lever 12, 22 is understood to be the connecting line between the first axis A11, A21 and the third axis A13, A23, or between the third axis A12, A22 and the second axis A12, A22.

In FIG. 6 a sectional view of a practical example of a stop device 60 is shown by way of the first adjusting mechanism 10a, wherein the features of this practical example may alternatively or additionally be provided on the second adjusting mechanism 10b. In the represented practical example, the stop lever is provided on the adjusting mechanism such that the latter acts between the first adjusting lever 11 and the second adjusting lever 12. To this end, a stop lever 16 is arranged on the first adjusting lever 11 in the represented practical example.

The stop lever 61 is formed integrally with the first adjusting lever 11 and as an extension thereof in the direction toward the second axis A2. The free end 62 of the stop lever 61 is provided to about against the upper side 12a of the second adjusting lever 12 when the extended position of the high lift flap K is maximum, i.e., when the high lift flap K is in its maximum extended position. An support device in particular having the form of a support plate 63 may be provided as a counter-support on the second adjusting lever 12 on which the stop lever 61 is supported when the adjusting mechanism 10a is in the maximum extended position.

Alternatively or additionally to this embodiment it is also possible for a stop lever 16 to be provided on the second adjusting lever 12. This results in the feature in analogy with the previously described practical example in which the stop lever 16 is arranged on the first adjusting lever 11.

Alternatively or additionally, the stop device 60, 70 may be executed with a stop lever 61, 71 for limiting the maximum extended position of the high lift flap K such that it acts between the high lift flap K and the second adjusting lever 12, 22 and/or between the main wing H and the first adjusting lever 11, 21.

In the former alternative, the stop lever 61, 71 is formed integrally with the second adjusting lever 12, 22 or with an armature of the high lift flap K and as a prolongation thereof in the direction toward the armature of the high lift flap K or toward the third joint 13, 23, and which is configured such that the free end 62, 72 of the stop lever 61, 71 may be taken to a position of abutment against the armature of the high lift flap K or the second adjusting lever 12, 22 in order to define the maximum extended position of the respective adjusting mechanism 10a, 10b.

In the latter alternative, the stop lever 61, 71 is formed integrally with the respective first adjusting lever 11, 21 or with an armature of the main wing H and as a prolongation thereof in the direction toward the armature of the main wing H or toward the third joint 13, 23, and which is configured such that the free end 62, 72 of the stop lever 61, 71 may be taken to a position of abutment against the armature of the main wing H or the first adjusting lever 11, 21 in order to define the maximum extended position of the respective adjusting mechanism 10a, 10b.

In accordance with various embodiments of the invention, the stop device may be configured such that the stop device 60, 70 limits a maximum extended position of the leading edge flap in which the directions of effect W11, W12 of the adjusting lever enclose an angle (alpha) of less than 180 degrees and, e.g., 179 degrees at the most.

In general the stop lever 61 may be provided with a spring device 65 which may in particular have the form of a reduced cross-section of the stop lever 61. In the practical example according to FIG. 6 it is hereby achieved that in the phase in which the adjusting device 10 reaches its maximum extended position, for instance when the free end of the stop lever 61 contacts the second adjusting lever or the support plate 63 thereof, the stop moments and stop forces generated in the process are received in an elastic manner by the stop lever 61. Hereby the stop of the adjusting levers 11, 12 is provided with an elastic reception path upon reaching the maximum extended position of the adjusting device or of the respective adjusting mechanism, and the stop forces are minimized. In this way the maximum occurring forces upon reaching the stop in the maximum extended position may be reduced and structural dimensioning may be optimized.

Figure 4:
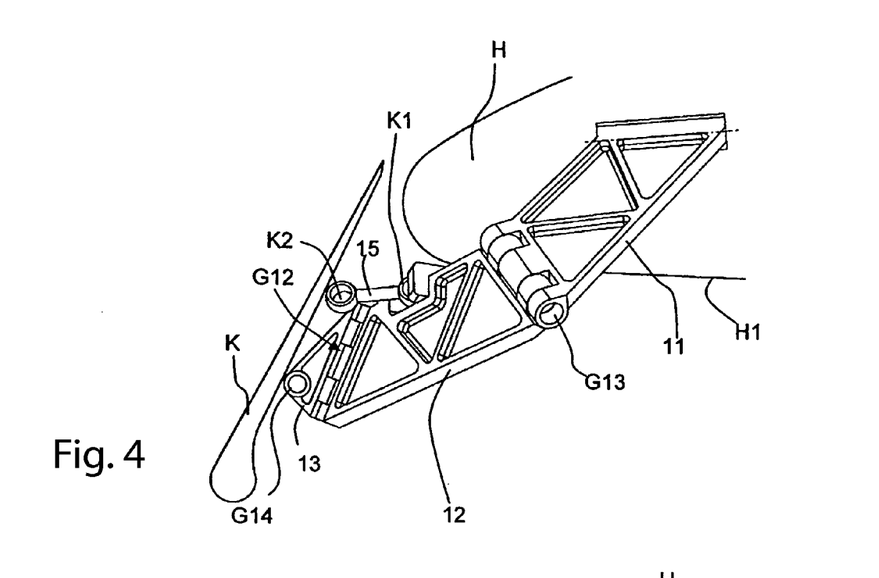
FIG. 4 is a schematic perspective lateral view of the adjusting mechanism according to FIG. 3, in a condition where the high lift flap is in a medium extended position.
Figure 5:
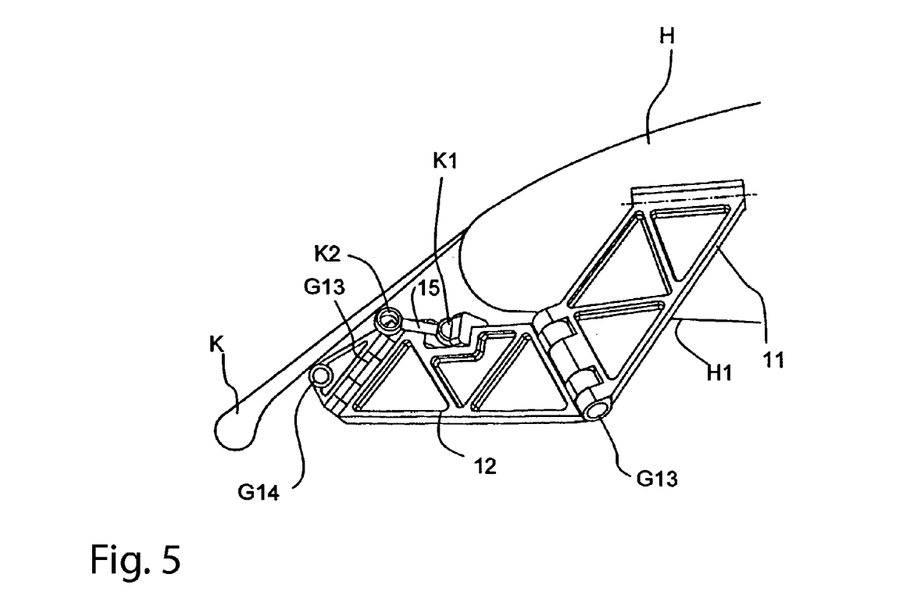
FIG. 5 is a schematic perspective lateral view of the adjusting mechanism according to FIG. 3 in a condition where the high lift flap is in its fully extended position.

Alternatively or additionally, the spring device may also be formed, e.g., by a spring device 75 acting between the first adjusting lever or the second adjusting lever (FIG. 4), as is provided in the practical example represented in FIG. 4. If the stop device 60, 70 for limiting the maximum extended position of the high lift flap K is to be executed such that it acts between the high lift flap K and the second adjusting lever 12, 22 and/or between the main wing H and the first adjusting lever 11, 21, a spring device according to FIG. 7 may analogously also be arranged on the main wing 10 or on the high lift flap K.

The spring device is arranged and executed such that it exerts on the respective adjusting mechanism or on the levers of the adjusting mechanism a resetting force whereby the adjusting mechanism or the levers of the adjusting mechanism may be moved to their retracted position. Furthermore the spring device may be provided and executed such that it serves the function of elastically cushioning the accomplishment of the maximum extended position of the respective adjusting mechanism.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An adjusting mechanism of an adjusting device for coupling an adjustable flap to a main wing of a wing and for adjusting the adjustable flap, the adjusting mechanism comprising:
   a first adjusting lever linked to the main wing via a first rotary joint so as to establish a first axis of rotation,
   a second adjusting lever,
   a third adjusting lever coupled in an articulated manner to the second adjusting lever via a second rotary joint so as to establish a second axis of rotation and coupled in an articulated manner to the adjustable flap via a fourth rotary joint, wherein the first adjusting lever and the second adjusting lever are coupled to each other in an articulated manner via a central joint so as to establish a third axis of rotation, and wherein the first, second and third axes of rotation pass through a common pole in every position of the adjustable flap,
   a pull-push rod connected to the second adjusting lever via a first ball joint and connected to the adjustable flap via a second ball joint.

2. The adjusting mechanism according to claim 1, wherein the fourth rotary joint has the form of a spherical rotary joint.

3. The adjusting mechanism according to claim 1, wherein the hinge joint of the fourth rotary joint is executed as a locating bearing with regard to the reception of forces on the adjustable flap that are directed in the span-wise direction of the adjustable flap.

4. The adjusting mechanism according to claim 3, wherein the fourth rotary joint is executed as a hinge joint.

5. An adjusting device for adjusting an adjustable flap on a wing of an aircraft, comprising at least two adjusting mechanisms arranged side by side in the span-wise direction of the wing and a drive device for adjusting the adjustable flap is arranged movably relative to the main wing, wherein at least one of the adjusting mechanisms comprises:
   a first adjusting lever linked to the main wing via a first rotary joint so as to establish a first axis of rotation,
   a second adjusting lever,
   a third adjusting lever coupled to the second adjusting lever in an articulated manner via a second rotary joint so as to establish a second axis of rotation and coupled to the adjustable flap in an articulated manner via a fourth rotary joint, wherein the first adjusting lever and the second adjusting lever are coupled to each other in an articulated manner via a central joint so as to establish a third axis of rotation, and wherein the first, second and third axes of rotation pass through a common pole in every position of the adjustable flap,
   a pull-push rod connected to the second adjusting lever via a first ball joint and connected to the adjustable flap via a second ball joint.

6. The adjusting device according to claim 5, wherein the fourth rotary joint of the adjusting mechanism has the form of a hinge joint in order to reduce the number of degrees of freedom of the mount of the adjustable flap.

7. The adjusting device according to claim 5, wherein the fourth rotary joint of the adjusting mechanism has the form of a spherical rotary joint in order to increase the number of degrees of freedom of the mount of the adjustable flap.

8. The adjusting device according to claim 5, wherein another one of the adjusting mechanisms comprises:
   a first adjusting lever linked to the main wing via a first rotary joint so as to establish a first axis of rotation,
   a second adjusting lever linked to the adjustable flap via a second rotary joint so as to establish a second axis of rotation,
   wherein the first and the second adjusting lever are connected to each other in an articulated manner via a central joint so as to establish a third axis of rotation, and
   wherein the first, second and third axes of rotation pass through a common pole in every position of the adjustable flap.

9. The adjusting device according to claim 5, wherein said adjustable flap is a leading edge flap.

10. The adjusting device according to claim 9, wherein said leading edge flap is a Krueger flap which, in its retracted position, is situated on the lower side of the main wing.

11. The adjusting device according to claim 9, wherein said leading edge flap is a slat.

12. The adjusting device according to claim 5, wherein said adjustable flap is a trailing edge flap.

13. The adjusting device according to claim 5, wherein said drive device is constituted by a linear drive.

14. The adjusting device according to claim 5, wherein the drive device is constituted by a rotary drive.

15. The adjusting device according to claim 5, wherein the wing comprises a stop device for limiting the maximum extended position of the adjustable flap, and the stop device is formed to comprise a stop lever acting between the first and the second adjusting lever, which is formed integrally with the first adjusting lever or with the second adjusting lever and as a prolongation thereof in the direction toward the second axis or toward the first axis, and which is configured such that the free end of the stop lever may be taken to a position of abutment against a support device on the second adjusting lever or on the first adjusting lever, to thereby define the maximum extended position of the respective adjusting mechanism.

16. The adjusting device according to claim 5, wherein the wing comprises a stop device for limiting the maximum extended position of the adjustable flap, and the stop device is formed to comprise a stop lever for limiting the maximum extended position of the adjustable flap which is formed integrally with the first adjusting lever or with an armature of the main wing and as a prolongation thereof in the direction toward the armature of the main wing or toward the third joint, and which is configured such that the free end of the stop lever may be taken to a position of abutment against the armature of the main wing or the first adjusting lever to thereby define the maximum extended position of the respective adjusting mechanism.

17. The adjusting device according to claim 5, wherein the wing comprises a stop device for limiting the maximum extended position of the adjustable flap, and the stop device is formed to comprise a stop lever for limiting the maximum extended position of the adjustable flap which is formed integrally with the second adjusting lever or with an armature of the adjustable flap and as a prolongation thereof in the direction toward the armature of the adjustable flap or toward the third joint, and which is configured such that the free end of the stop lever may be taken to a position of abutment against the armature of the adjustable flap or the second adjusting lever, to thereby define the maximum extended position of the respective adjusting mechanism.

* * * * *